United States Patent
Schlesinger et al.

(10) Patent No.: US 11,436,541 B2
(45) Date of Patent: Sep. 6, 2022

(54) MACROTASK EXECUTION FOR DIGITAL ASSISTANT DEVICES

(71) Applicant: Microsoft Technology Licensing, LLC, Redmond, WA (US)

(72) Inventors: Benny Schlesinger, Ramat Hasharon (IL); Yuval Borsutsky, Rishon Le-Zion (IL); Eldar Cohen, Tel Aviv (IL); Keren Damari, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 434 days.

(21) Appl. No.: 15/423,350

(22) Filed: Feb. 2, 2017

(65) Prior Publication Data
US 2018/0218293 A1   Aug. 2, 2018

(51) Int. Cl.
*G06Q 10/02*   (2012.01)
*G10L 15/26*   (2006.01)

(52) U.S. Cl.
CPC ............ *G06Q 10/025* (2013.01); *G10L 15/26* (2013.01)

(58) Field of Classification Search
CPC ...... G06Q 10/00; G06Q 10/102; G06Q 10/20; G06Q 10/067; G06Q 10/0633;
(Continued)

(56) References Cited

U.S. PATENT DOCUMENTS 5,983,200 A * 11/1999 Slotznick ............. G06Q 10/025
                                                    705/1.1
8,849,842 B2 * 9/2014 Reisman ............... G06F 16/951
                                                    707/758
(Continued)

FOREIGN PATENT DOCUMENTS

CN    107909334 A  *  4/2018  ........... G06Q 10/103
EP      3296867 A1 *  3/2018  .......... G06F 11/3476

OTHER PUBLICATIONS

"Productivity Decomposed: Getting Big Things Done with Little Microtasks," by Jaime Teevan, Jeffrey P. Bigham, Shamsi T.Iqbal, Carrie J. Cai, Michael S. Bernstein, and Elizabeth M. Gerber, May 7-12, 2016 (Year: 2016).*
(Continued)

*Primary Examiner* — Jeff Zimmerman
*Assistant Examiner* — Brian Adams Heflin
(74) *Attorney, Agent, or Firm* — Shook, Hardy & Bacon L.L.P.

(57) ABSTRACT

Techniques for providing digital assistant devices with the capability to plan and execute complex macrotasks. In an aspect, a digital assistant device queries an online macrotask repository for task templates associated with a macrotask. The task templates may be designed and configured by Internet crowd-sourcing, with oversight from human editors. Based on a retrieved task template, a digital assistant device may automatically execute autonomous microtasks specified by the task template, and further elicit user input for executing certain microtasks requiring user oversight and/or confirmation. The online macrotask repository enables digital assistant devices to execute a broad range of complex macrotasks that would otherwise be difficult to execute in a satisfactory manner.

20 Claims, 13 Drawing Sheets

(58) Field of Classification Search
CPC ..... G06Q 10/063114; G06Q 10/06316; G06Q
10/06393; G06Q 10/06398; G06Q
10/063112; G06Q 50/01; G06Q 20/20;
G06Q 20/102; G06Q 30/0208; G06Q
30/028; G06Q 30/0282; G06Q 30/0201;
G06Q 10/103; H04L 67/02; H04L 67/10;
H04L 67/329; H04L 67/38; H04L
67/1097; H04L 67/18; H04L 67/22;
G06N 3/008; G06N 3/08; G06N 3/0454;
G06F 16/243; G06F 16/245; G06F
16/24564; G06F 16/248; G06F 16/283;
G06F 21/10; G06F 21/31; G06F 21/316;
G06F 21/32; G06F 21/552; G06F 21/56;
G06F 21/562; G06F 21/566; G06F
21/645; F02B 2075/027; G07F 1/324;
G07F 1/3287; G07F 1/329; G07F 1/3296;
G05B 2219/32424; G05B 2219/40113;
G05B 2219/32423
USPC ...... 718/100, 102, 104, 107; 705/7.13, 7.14,
705/7.21, 7.22, 7.26; 716/16, 20; 706/6;
715/963
See application file for complete search history.

(56) References Cited

U.S. PATENT DOCUMENTS

| | | | | |
|---|---|---|---|---|
| 10,659,593 | B2* | 5/2020 | Chu | G04G 13/026 |
| 2006/0053043 | A1* | 3/2006 | Clarke | G06Q 10/06314 |
| | | | | 705/7.17 |
| 2006/0235768 | A1* | 10/2006 | Tatum, Jr. | G06Q 10/02 |
| | | | | 705/28 |
| 2008/0059967 | A1* | 3/2008 | Matsui | G06Q 10/00 |
| | | | | 718/102 |
| 2009/0070773 | A1 | 3/2009 | Depoutovitch et al. | |
| 2009/0210262 | A1* | 8/2009 | Rines | G06Q 10/02 |
| | | | | 705/5 |
| 2010/0077327 | A1 | 3/2010 | Pulsipher et al. | |
| 2011/0314375 | A1 | 12/2011 | Zaika et al. | |
| 2012/0011511 | A1* | 1/2012 | Horvitz | G06F 9/4806 |
| | | | | 718/100 |
| 2012/0054112 | A1 | 3/2012 | Gormish et al. | |
| 2013/0024452 | A1* | 1/2013 | Defusco | G06F 40/186 |
| | | | | 707/737 |
| 2013/0346134 | A1* | 12/2013 | Klug | G06Q 10/063114 |
| | | | | 705/7.15 |
| 2014/0007113 | A1* | 1/2014 | Collin | G06F 9/46 |
| | | | | 718/102 |
| 2014/0039985 | A1 | 2/2014 | Oleson et al. | |
| 2014/0220546 | A1* | 8/2014 | Mandel | G09B 19/00 |
| | | | | 434/428 |
| 2014/0358605 | A1 | 12/2014 | Balamurugan et al. | |
| 2015/0199651 | A1* | 7/2015 | Raman | G06Q 10/1095 |
| | | | | 705/7.19 |
| 2015/0213360 | A1 | 7/2015 | Venanzi et al. | |
| 2015/0309769 | A1 | 10/2015 | Greene et al. | |
| 2015/0324229 | A1 | 11/2015 | Valine | |
| 2015/0332188 | A1 | 11/2015 | Yankelevich et al. | |
| 2016/0188738 | A1* | 6/2016 | Gruber | G06F 16/9535 |
| | | | | 707/722 |
| 2017/0178626 | A1* | 6/2017 | Gruber | G10L 15/22 |
| 2021/0049440 | A1* | 2/2021 | Sim | G06N 3/004 |

OTHER PUBLICATIONS

"Break It Down: A Comparison of Macro- and Microtasks," by Justin Cheng, Jaime Teevan, Shamsi T. Iqbal, Michael S. Bernstein, Stanford Univerity, Apr. 18-23, 2015 (Year: 2015).*

Kucherbaev, Pavel, "Quality Assurance Strategies in Microtask Crowdsourcing", In PhD Thesis of University of Trento, Mar. 2016, 88 pages.

Cheng, et al., "Break It Down: A Comparison of Macro- and Microtasks", In Proceedings of Conference on Human Factors in Computing Systems, Apr. 18, 2015, pp. 1-4.

Latoza, et al., "Microtask programming: building software with a crowd", In Proceedings of 27th Annual ACM Symposium on User Interface Software and Technology, Oct. 5, 2014, pp. 43-54.

* cited by examiner

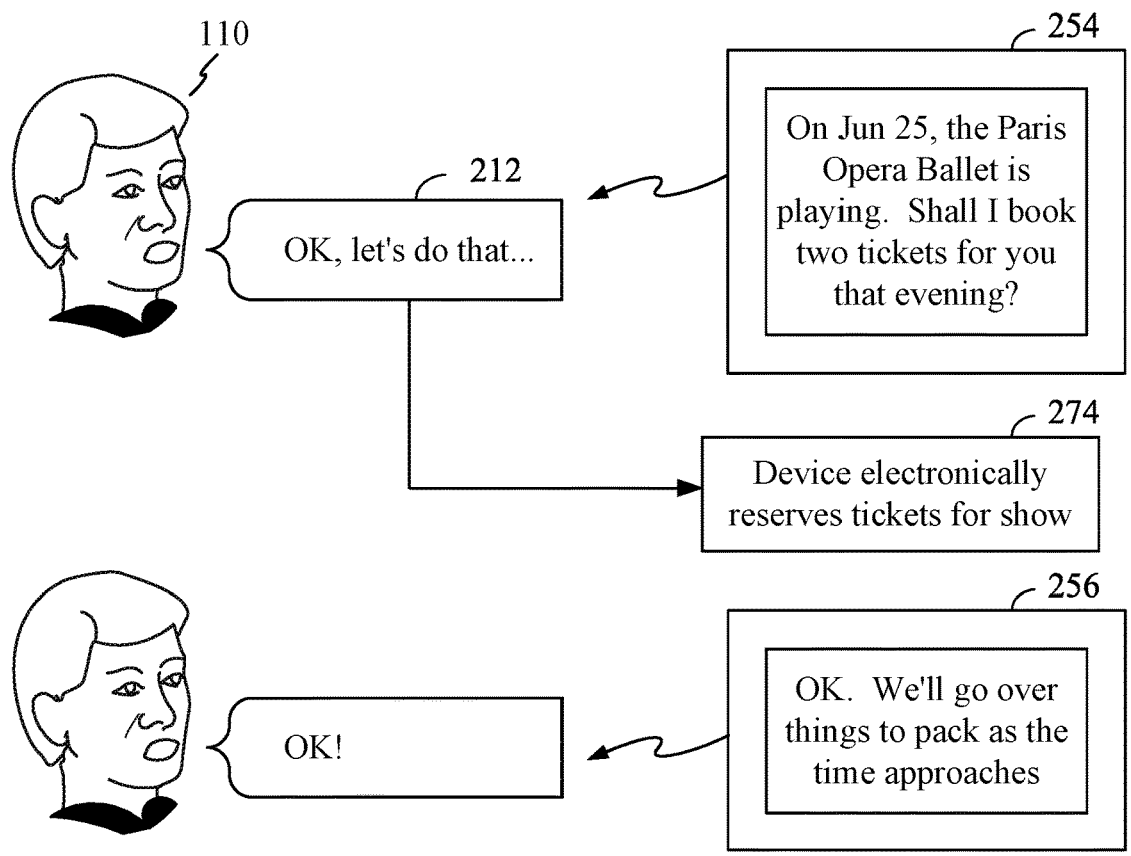
Two weeks before the trip
⋮
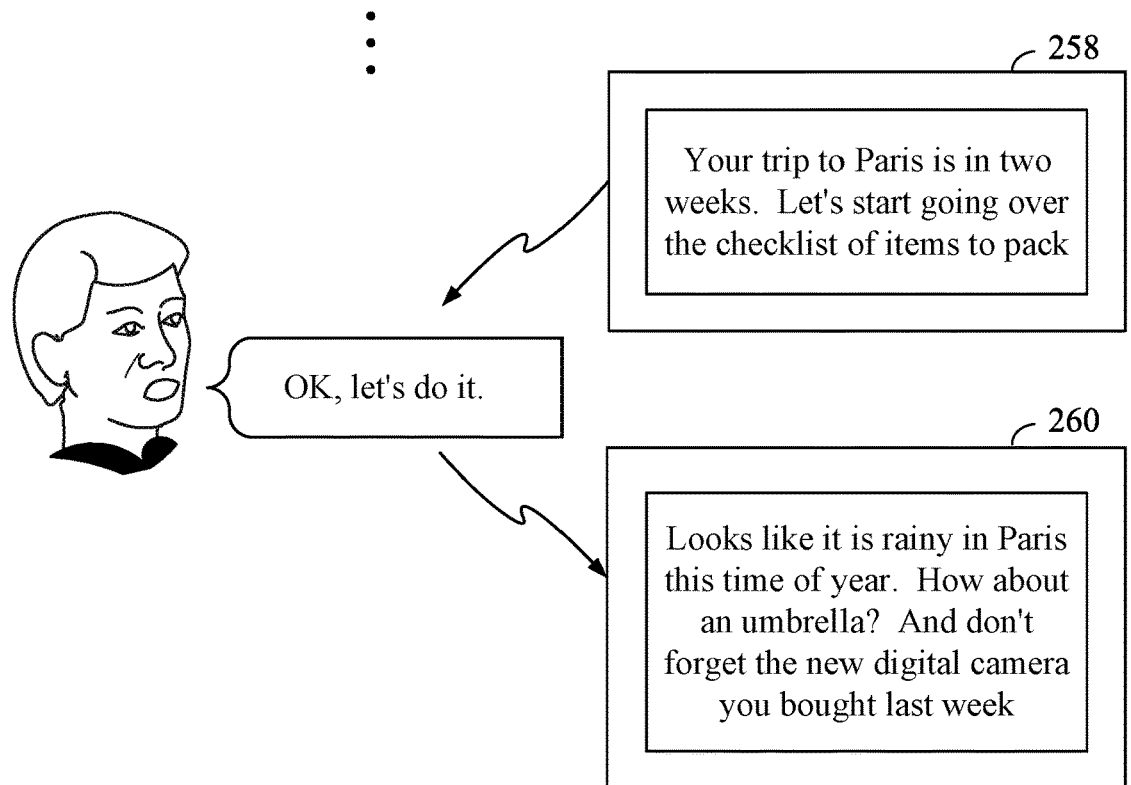
FIG 3

MACROTASK EXECUTION FOR DIGITAL ASSISTANT DEVICES

BACKGROUND

State-of-the-art digital assistant devices such as smartphones and personal computers are capable of executing a wide range of personal tasks for users, including calendar and/or appointment scheduling, position navigation, online search and retrieval for informational queries, etc. Such tasks generally pose well-defined problems from a technical standpoint, thus enabling device programmers to break them down into discrete steps and formulate them as software code for execution.

In contrast, many complex tasks routinely handled by humans are not particularly well-defined from a technical standpoint. For example, planning a wedding or an overseas trip, moving into a new apartment, and buying a house or car are all examples of complex "macrotasks" which current digital assistant devices are ill-equipped to handle. The utility of digital assistant devices in such situations is generally limited to providing advisory information, such as may be obtained through online web search, or otherwise providing simple, generic reminders through a calendar application, etc.

It would be desirable to provide techniques for empowering digital assistant devices to perform and execute complex macrotasks currently beyond state-of-the-art capabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for providing a digital assistant device in communication with a task server storing an online macrotask repository. In an aspect, when a user desires to perform a macrotask, the digital assistant device queries an online macrotask repository for task templates associated with the macrotask. The task templates may be designed and configured by human editors, users, and/or crowd-sourcing.

Based on a retrieved task template, the digital assistant device may automatically schedule and execute microtasks specified by the task template, and further elicit user input for executing certain microtasks requiring user oversight and/or confirmation. The online macrotask repository enables digital assistant devices to execute a broad range of complex macrotasks that would otherwise be difficult to perform in a satisfactory manner.

Other advantages may become apparent from the following detailed description and drawings.

BRIEF DESCRIPTION OF THE DRAWINGS

FIGS. 2-4 illustrate exemplary capabilities of a digital assistant device having macrotask processing capabilities according to the present disclosure.

DETAILED DESCRIPTION

Various aspects of the technology described herein are generally directed towards techniques for configuring digital devices and servers for handling macrotasks having multiple manners of execution. The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
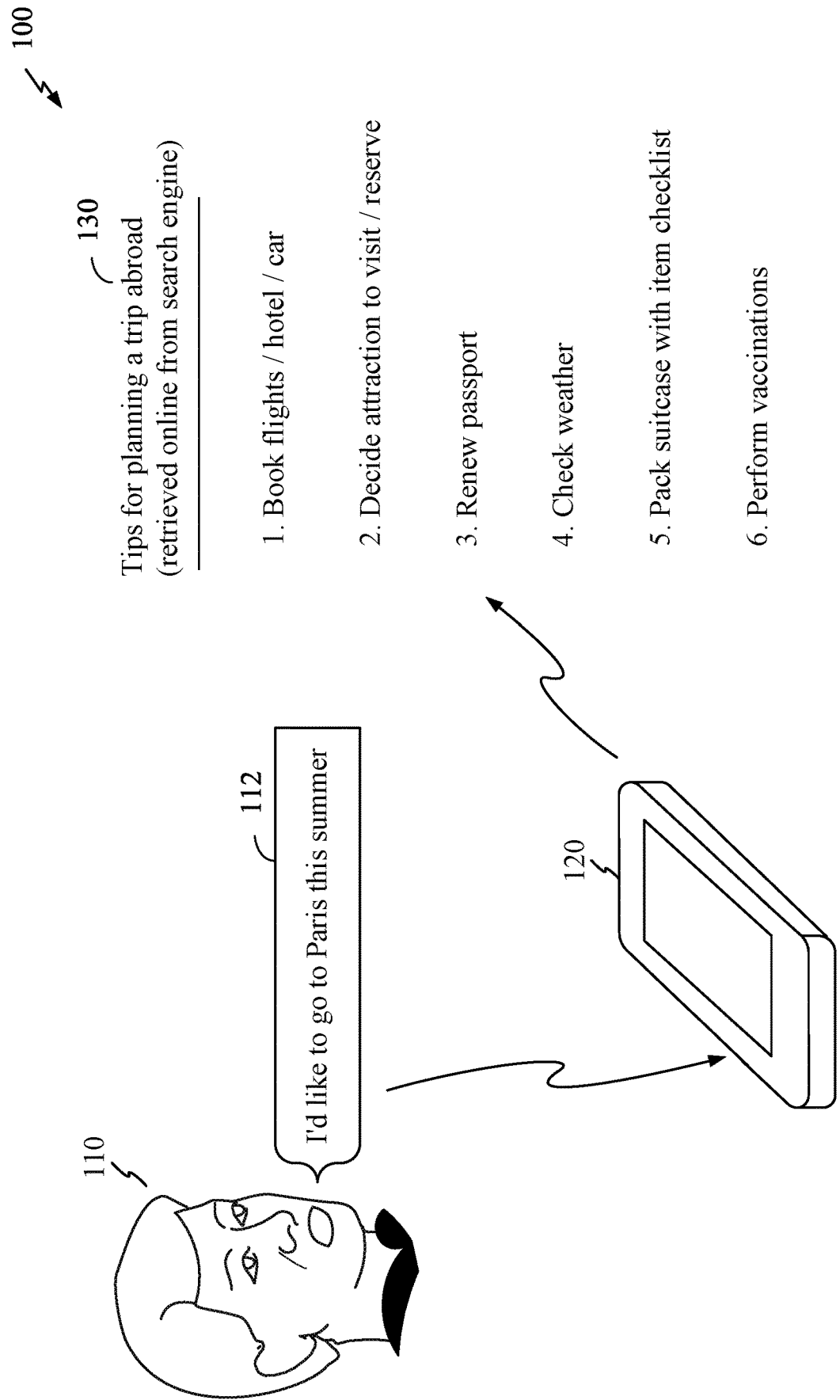
FIG. 1 illustrates an exemplary scenario showing certain aspects of the present disclosure.

FIG. 1 illustrates an exemplary scenario 100 showing certain aspects of the present disclosure. Note FIG. 1 is shown for illustrative purposes only, and is not meant to limit the scope of the present disclosure, e.g., to any particular tasks or applications of the techniques described herein.

In FIG. 1, digital assistant device 120 is configured to communicate with user 110 to assist user 110 in performing a variety of tasks. Such tasks may include, but are not limited to, e.g., calendar and/or appointment scheduling, online search and retrieval for informational queries, position location, etc. Tasks may also include interactive communications features such as mobile phone connectivity, e-mails, social networking, instant messaging, etc. In exemplary embodiments, device 120 may correspond to, e.g., a smartphone, smartwatch, personal computer, or any other type of portable or non-portable electronic device.

Device 120 may support any of a plurality of modalities for sending output to, and processing input from, user 110. Such modalities may include, e.g., audio input/output via text synthesis and speech recognition, visual output via a display screen, tactile input via a touch screen, keyboard and/or visual recognition of user gestures, etc.

While state-of-the-art digital assistant devices are generally capable of performing a wide variety of tasks such as mentioned hereinabove, the range of tasks is typically confined to those that are relatively simple and well-defined. In general, these "microtasks" clearly define what is to be technically executed by the digital device, even if there are differences in the execution. For example, an alarm function must basically provide an alert at a preset time, regardless of how that alert is presented, etc. The nature of microtasks means that they can readily be implemented using pre-programmed software code, and the quality of their execution is readily quantifiable using straightforward technical benchmarks.

In contrast to microtasks, human beings routinely perform more complex "macrotasks" that are not as readily defined from a machine perspective, and which may be open to many subjective interpretations of what exactly is to be performed. Such macrotasks differ from microtasks in that it is often not clear what constitutes "satisfactory" implementation of the macrotask.

FIG. 1 illustrates an example of a macrotask initiated by user 110, who expresses a desire to plan a trip to Paris with the statement or "macrotask request" 112. In this scenario, unlike for microtasks such as setting an alarm or making a phone call, it is unclear how device 120 should respond to the macrotask request 112. It will be appreciated that the difficulty stems in part from the open-ended nature of the macrotask, e.g., what steps could reasonably be performed by device 120, when and how those steps should be performed, etc. Furthermore, even if a specific set of default steps might be enumerated and executed by device 120 for any given macrotask, the subjective nature of macrotasks requires that the user remain closely involved with task execution. For example, regarding request 112, one user may desire to fly to Paris on a first-class flight, while another might want to go backpacking, etc.

As a possible way to address the situation, device 120 may interpret macrotask request 112 as simply a query to obtain further information about planning the macrotask. In this case, device 120 may submit an online query for "tips for planning a trip abroad," e.g., to an Internet search engine or other specific online websites. Responsive to the submitted query, certain exemplary steps and/or recommendations for planning a trip to Paris may be retrieved. An illustrative list of retrieved steps is shown in FIG. 1 under column 130 and may be delivered to user 110, e.g., as synthesized speech, or displayed on a screen, etc. Such information might be considered "static" in that no dynamic customizations to the query or retrieved search results are made depending on the user, task, etc., and no explicit actions are taken by the digital assistant device other than displaying the retrieved information to the user. Note the exemplary information shown in FIG. 1 is provided for illustrative purposes only, and is not meant to limit the scope of the present disclosure to any particular types of tasks that may be suggested or performed.

In an exemplary embodiment, the retrieved information 130 may be derived from a single source, e.g., a web page produced by a single human editor, or culled from multiple sources, e.g., multiple human editors each with their own opinions and recommendations. Given the nature of macrotasks, many different versions of task listings may generally be available for any given task.

It will be appreciated that in FIG. 1, device 120 essentially acts as an advisor in responding to the user's macrotask request, i.e., device 120 advises user 110 on what steps to take to perform the macrotask. While such advisory capability may be useful, it would be desirable to equip digital assistant devices with even more powerful capabilities to assist in not only planning but executing a wide range of macrotasks.

Figure 2:
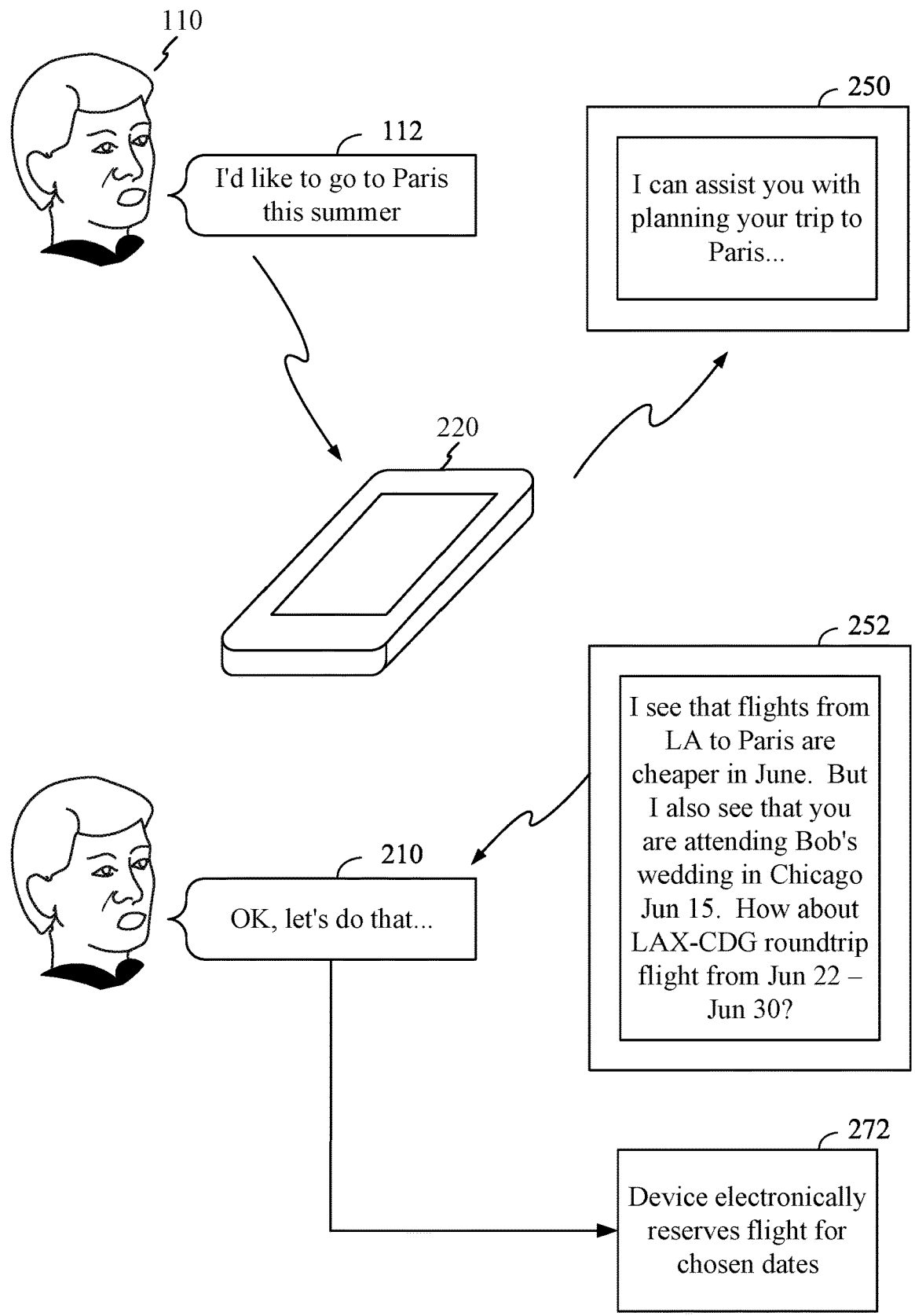
Figure 4:
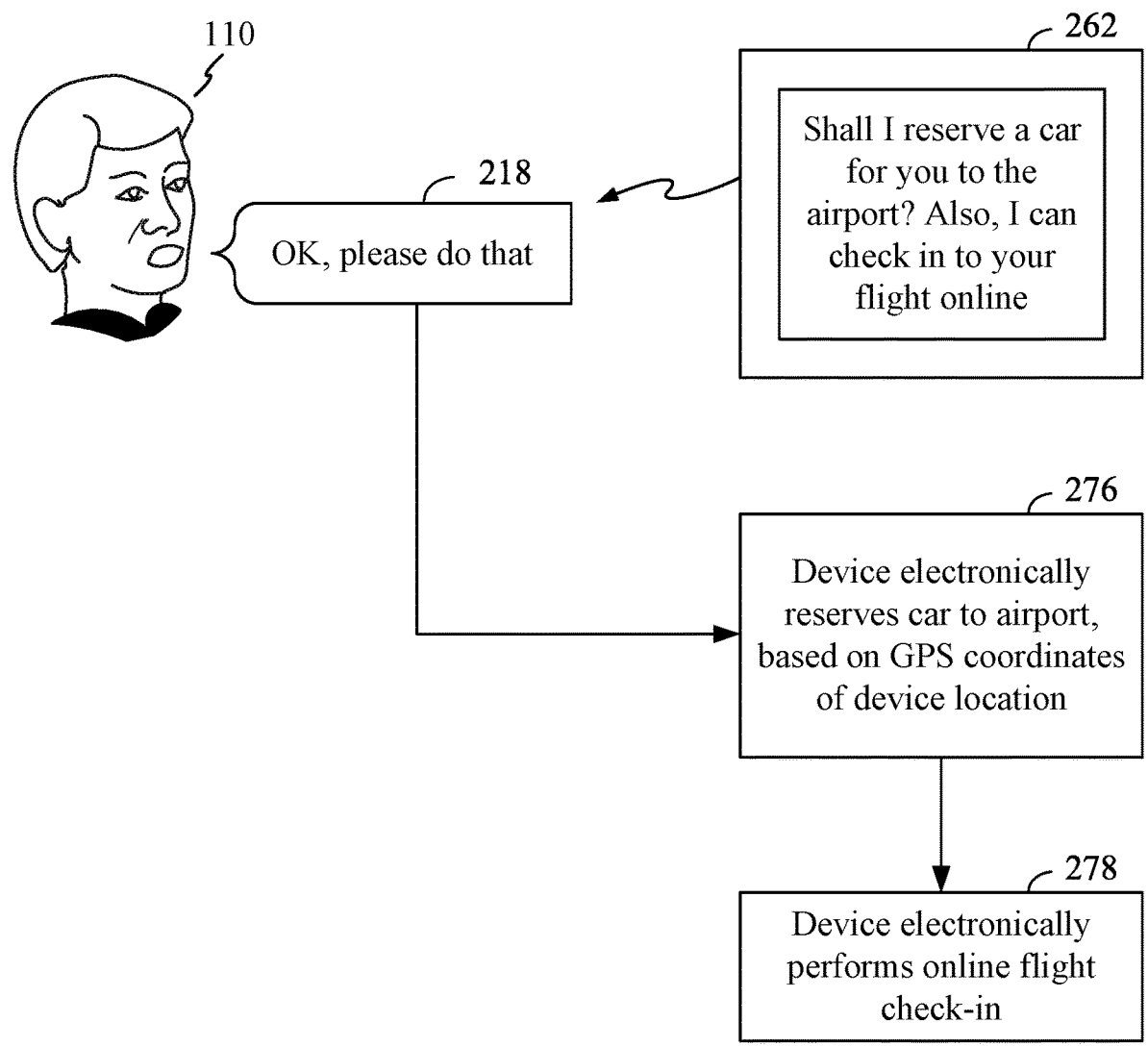

FIGS. 2-4 illustrate exemplary capabilities of a digital assistant device 220 having macrotask processing capabilities according to the present disclosure. Note FIGS. 2-4 are shown for illustrative purposes only, and are not meant to limit the scope of the present disclosure to any particular tasks, sequence of tasks, or types of interaction that may be conducted with the user.

In FIG. 2, user 110 issues to digital assistant device 220 a macrotask request 112 for assistance in planning a trip. In response, device 220 may deliver a plurality of "updates" 250-262 to user 110, using any output modality available, e.g., on a display, as synthesized speech, etc.

In particular, after receiving macrotask request 112, device 220 generates a first update 250 to indicate that the macrotask specified in request 112 is recognized, and that device 220 is capable of assisting user 110 in executing the macrotask.

At update 252, device 220 proposes a period of time (e.g., June 22-30) during which the trip may be taken. As indicated, device 220 may suggest the block of time based on knowledge of other appointments of user 110 (e.g., Bob's wedding), as well as availability and favorable pricing of air tickets (e.g., cheaper tickets in June), etc. Based on update 252, user 110 approves the proposed itinerary with confirmation statement 210.

Upon receiving statement 210, device 220 may perform the task indicated at block 272. For example, device 220 may electronically book the roundtrip flight from Los Angeles to Paris for the dates indicated. To perform this task, further operations (not shown in FIG. 2) may be performed by device 220, including confirming airline/seating choice with user 110, airfare, method of payment, etc. Alternatively, user preferences for such choices may be stored and utilized by device 220. Note the task indicated at block 272 is similar to a microtask, in that the technical objective of the task is now much more clearly defined from the perspective of the machine, compared to the initial macrotask of planning a trip to Paris.

As another component of the trip planning, device 220 may also assist in proposing and planning specific events for the user during the trip. For example, in FIG. 3, update 254 suggests purchasing tickets to a show. Note the suggestion may be made, e.g., with reference to the dates proposed at update 252 and confirmed by user 110, known hobbies of user 110 as surmised by device 220, records of past show attendances or other records available, etc. In response to update 254, user approval 212 is granted, and device 220 electronically reserves tickets for the show at block 274. In certain exemplary embodiments (not shown in FIG. 2), besides or in addition to giving approval, user 110 may also reject, modify, or ask for alternative suggestions, e.g., alternative price and seating availability, purchasing tickets to other shows, etc.

As part of the macrotask execution, device 220 may further offer reminders to the user at different points in time prior to and/or during macrotask execution. For example, at update 256, the device offers to remind the user to go over an item packing list for the trip two weeks before departure. Subsequently, at the appointed time, the device provides the reminders at updates 258-260. In particular, at update 260, device 220 reminds the user to bring items based on, e.g., local weather at the destination, or recently purchased items based on the user's online shopping history, etc.

As another example of macrotask execution, on the day of the trip at update 262 in FIG. 4, device 220 offers to reserve a ride to the airport for the user, and to perform online check-in for the flight. Based on user approval 218, at block 276 the device electronically reserves the car to the airport, e.g., based on GPS coordinates of the device location, and using an online car reservation service. At block 278, the device electronically performs the requested flight check-in.

Further disclosed hereinbelow are techniques for implementing a digital assistant device capable of performing functionality such as described hereinabove for the trip planning macrotask, as well as other functionality for different macrotasks of varying scope and complexity.

Figure 5:
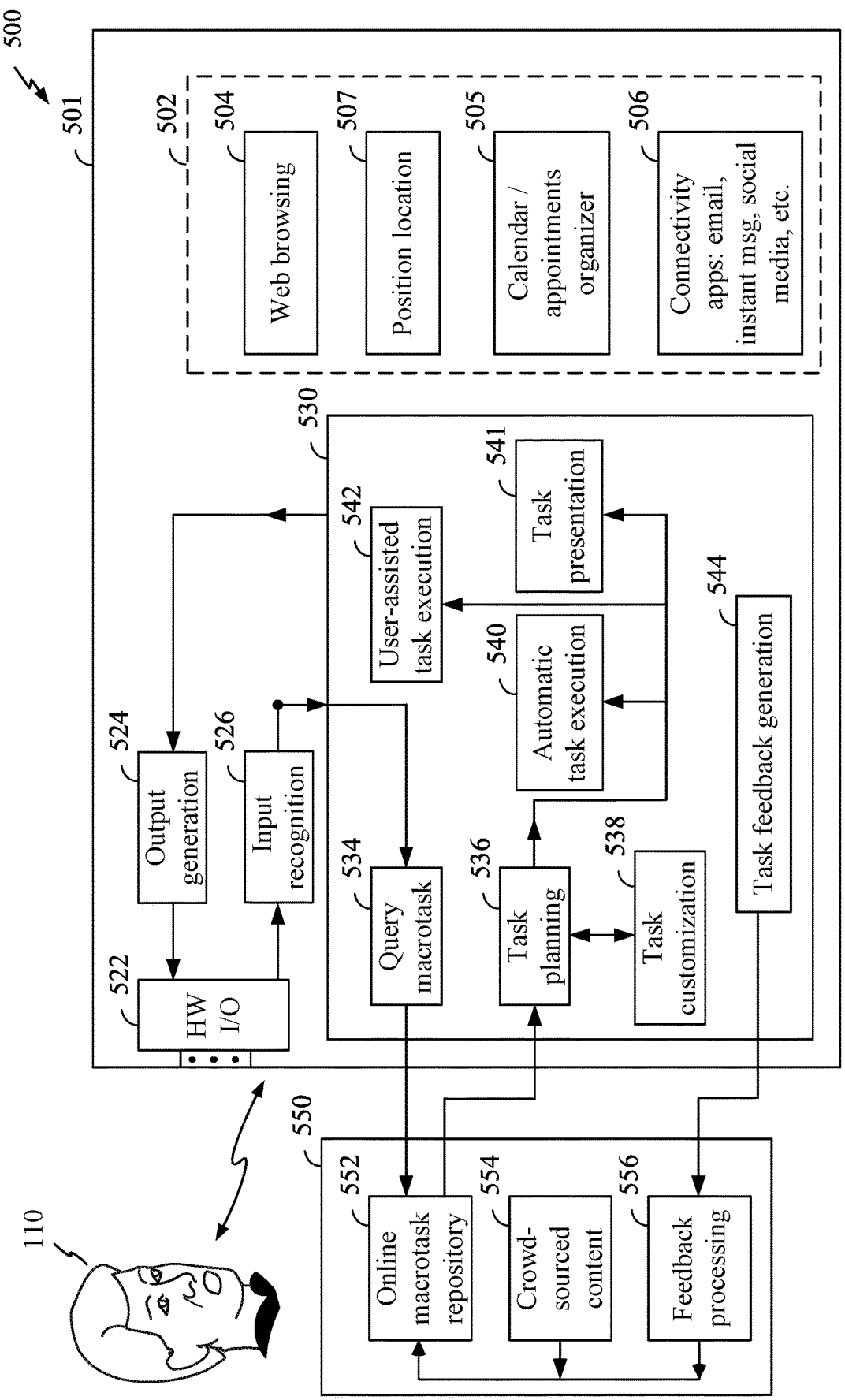
FIG. 5 illustrates an exemplary embodiment of a task processing system according to the present disclosure, including digital assistant device and task server.

FIG. 5 illustrates an exemplary embodiment of a task processing system 500 according to the present disclosure, including digital assistant device 501 and task server 550. It will be appreciated that digital assistant device 501 may correspond to device 220 described hereinabove with reference to FIGS. 2-4. Note FIG. 5 is shown for illustrative purposes only, and is not meant to limit the scope of the present disclosure to any particular functional implementations. It will be appreciated that alternative exemplary embodiments, e.g., alternatively partitioning the functionality described, may readily be derived in view of the techniques disclosed, and such alternative exemplary embodiments are contemplated to be within the scope of the present disclosure.

In FIG. 5, digital assistant device 501 may be a "smart" device that supports a diverse array of functionality 502 not necessarily specific to macrotask execution. Such functionality 502 includes, but is not limited to, web browsing capability 504 (with associated storage of web browsing history), position location 507, calendar/appointment organizer 505, connectivity applications 506 such as email, instant messaging, social media, etc. It will be appreciated that usage of functionality 502 by user 110 provides a source of data which may be used by device 501 to customize macrotask processing to user 110, as will be further described hereinbelow with reference to operations performed by macrotask module 530.

User 110 communicates with device 501 using any input/output modality supported by device 501. In particular, device 501 may include one or more hardware input/output (HW I/O) blocks such as block 522 for implementing the input/output modalities. In exemplary embodiments, block 522 may include a sound speaker, microphone, LED display, touch display, etc.

Coupled to HW I/O block 522 are output generation block 524 and input recognition block 526. In particular, output generation block 524 may convert signals generated by macrotask module 530, further described hereinbelow, into output signals for block 522. For example, output generation block 524 may include a speech synthesis module, a visual display formatting module, and/or other modules.

Input recognition block 526 may convert input signals received at block 522 from user 110 into input signals to be provided to macrotask module 530. For example, input recognition block 526 may include a speech recognition module, touchscreen decoder, keypad, and/or other modules.

Coupled to output generation block 524 and input recognition block 526 is macrotask module 530, which handles logical processing for the macrotask execution functionality described herein. Module 530 includes macrotask query block 534, task scheduling block 536, and task customization block 538.

In particular, macrotask query block 534 may receive a request or indication to perform a macrotask from the user, e.g., as a macrotask request (such as request 112) made by the user. In an exemplary embodiment, the macrotask request may be in the form of user speech, typed text, etc., recognized by input recognition block 526. Query block 534 formulates an appropriate query based on the macrotask request, and communicates with a macrotask repository to determine whether the requested macrotask is supported by task processing system 500. In an exemplary embodiment, the formulated query may correspond directly to the statement input by the user.

In an exemplary embodiment, the macrotask repository may correspond to online macrotask repository 552, residing on a task server 550 separate from device 501. Note server 550 may communicate with device 501 using a network connection, e.g., wired or wireless Internet connection. In an exemplary embodiment, macrotask repository 552 may store a comprehensive array of macrotasks, each macrotask associated with one or more customizable task templates. A task template, an example of which is given hereinbelow with reference to FIG. 8, breaks down a macrotask into a plurality of microtasks that are individually implementable by a digital assistant device. The task template may sequence the microtasks in a certain order, indicate scheduling and/or timing information for each microtask, and/or specify other details of macrotask implementation.

In an exemplary embodiment, any task template in online macrotask repository 552 may be configured and/or designed, e.g., by human editors associated with task processing system 500, or directly by user 110 or other users. In an exemplary embodiment, any task template in online macrotask repository 552 may be alternatively or further configured and/or designed according to a "crowd-source" scheme. In particular, the design of a task template may be assigned to and performed by a large plurality of distinct human participants over the Internet. In an exemplary embodiment, human participants may vote for inclusion, exclusion, and/or specification of any microtask within a task template for a macrotask. In an exemplary embodiment, oversight for crowd-sourced task template creation may be provided by one or more human editors. These editors may, e.g., organize individual crowd-sourced contributions, and exercise supervisory discretion in allowing or disallowing certain changes or updates to any task template. Editors themselves may also contribute content to task profiles. It will be appreciated that an advantage of crowd-sourcing the creation of task templates is the ability to solicit a wide variety of opinions on how to perform macrotasks, which by their nature are amenable to many different interpretations and modes of execution.

In an exemplary embodiment, crowd-sourced input on task templates may be solicited from Internet users who may or may not be users of digital assistant devices according to the present disclosure. For example, an online poll may be conducted on a social media audience or any other type of audience, soliciting opinions on how a macrotask such as "planning an overseas trip" should best be broken down into smaller tasks. Crowd-sourcing may further advantageously be designed to incorporate crowd feedback on pre-existing versions of task templates, thereby enabling refinement and optimization of task templates over time. As further discussed hereinbelow, crowd-sourced input on creating or refining task templates may be combined with other types of input, e.g., human editorial input, or direct solicitation of feedback from users who have used or are using a particular task template to perform a task.

In an exemplary embodiment, each microtask specified by a task template may specify a sequence of digital operations executable on a computing device such as device 501. The digital operations specified by each microtask in a task template are explicitly chosen to be executable by a digital assistant device such as device 501. For example, a microtask of "set alarm for 9:30 am on Saturday" may be specified using a software programming language such as C, C++, C#, Java, etc., or a dedicated task assistant language configured especially for the task processing system. The dedicated task assistant may contain a library of functions that may be commonly called upon by task assistant applications, e.g., setting reminders, making online reservations or purchases, selecting forms of electronic payment, etc. In an exemplary embodiment, the specification of digitally executable operations for each microtask may be crowd-sourced, made by users of task templates, and/or be overseen by human editors.

In an exemplary embodiment, task templates may optionally be made customizable to particular user or device characteristics, or to particular parameters of the task itself, by specifying conditional qualifiers with respect to any digital operation. Such customization may be performed by, e.g., task customization block 538. For example, a microtask specified in the trip planning task template may be configured to recommend purchasing tickets to a dance show for an itinerary, conditioned upon "viewing dance performances" being listed as one of a user's hobbies. Data on the user's hobbies, as well as other customizable user or device characteristics, may be available from usage history and/or profile information stored on device 501, or any online/application services accessed by the user. Furthermore, the identity or other parameters of the macrotask itself may allow certain customizations to the task template. For example, a template for "planning a trip" may include a microtask to remind the user to "get vaccinations," wherein such microtask is enabled only when the destination country requires vaccinations for entry.

It will be appreciated that digital operations may be performed directly within macrotask module 530, or they may be within the general capability of device 501, e.g., functionality 502 earlier described hereinabove with reference to FIG. 5. A digital operation commonly be employed when executing microtasks is the operation of eliciting user guidance and/or confirmation prior to executing any part of the microtask, e.g., as illustrated at updates 252, 256 in FIGS. 2 and 3. It will be appreciated that this operation may correspond to a simple software programming language command to prompt a user for input prior to proceeding with task execution.

Returning to FIG. 5, if online macrotask repository 552 contains a task template for a queried macrotask, then the task template may be transmitted back to module 530 of device 501. In particular, task scheduling block 536 of module 530 receives the retrieved task template, and prepares and schedules the microtasks contained in the task template for execution by device 501.

In an exemplary embodiment, block 534 may communicate with task customization block 538 to customize specific parameters of the retrieved task template to user 110, prior to or during microtask execution. For example, specific characteristics or details of user 110, which may otherwise be available to device 501 by virtue of its use as a smartphone, personal computer, etc., may be utilized to customize specific microtasks to the user. Furthermore, functionality 502 referred to hereinabove may also be utilized for customization. An example of task template customization is further described hereinbelow with reference to FIG. 10.

Following task scheduling and preparation by block 536, the specified microtasks may be executed by automatic task execution block 540, or with further assistance from the user by user-assisted task execution module 542. In particular, block 540 automatically executes certain types of microtasks that do not require further user input. For example, such microtasks may include automatically displaying tips or information, providing audio reminders at certain time, etc. Block 542 executes other types of microtasks that do require further user input or approval. For example, reserving a flight or hotel for an itinerary suggested by device 501 may require user approval to proceed. Accordingly, block 542 may communicate with output generation block 524 and input recognition block 526 to facilitate further interaction with user 110. In an exemplary embodiment, at task presentation block 541, the user may be presented with a list of micro-tasks and dates. The user can suitably edit the list, and/or track progress against the list.

In an exemplary embodiment, upon completion of the microtasks specified in a task template, or at any stage during execution of the microtasks, feedback may be solicited from user 110 by task feedback generation block 544 regarding the quality of macrotask execution, e.g., whether the suggested task template is well-suited to the user's needs, and/or other changes or modifications that the user suggests to improve task template or task execution. Block 544 may communicate such feedback to feedback processing block 556 of task server 550.

In an exemplary embodiment, input on task templates may be derived from such feedback as received by feedback processing block 556 from individual user devices such as device 501. For example, a user who has used the trip planning task template may provide feedback that the car reservation microtask would be better scheduled at the same time as (rather than after) flight reservations, etc. The user feedback may be used to refine and optimize future versions of task templates, e.g., subject to human editorial supervision, as in the case of crowd-sourcing. Feedback may be received at any time, e.g., during or after macrotask execution by a user of the task template. For example, at any time, a user may add steps that he or she deems is missing from the task template, e.g., by invoking the digital assistant and issuing a statement to that effect (e.g., "I just remembered that I also need to inform my Internet provider about my move" in the context of the macrotask of moving into a new apartment). Similarly, at any time during or following execution of the macrotask, the digital assistant device may solicit feedback from the user (e.g., "How was your trip? Were there any preparation steps that you wish you had done prior to your trip?" in the context of the macrotask of planning a trip).

Figure 6:
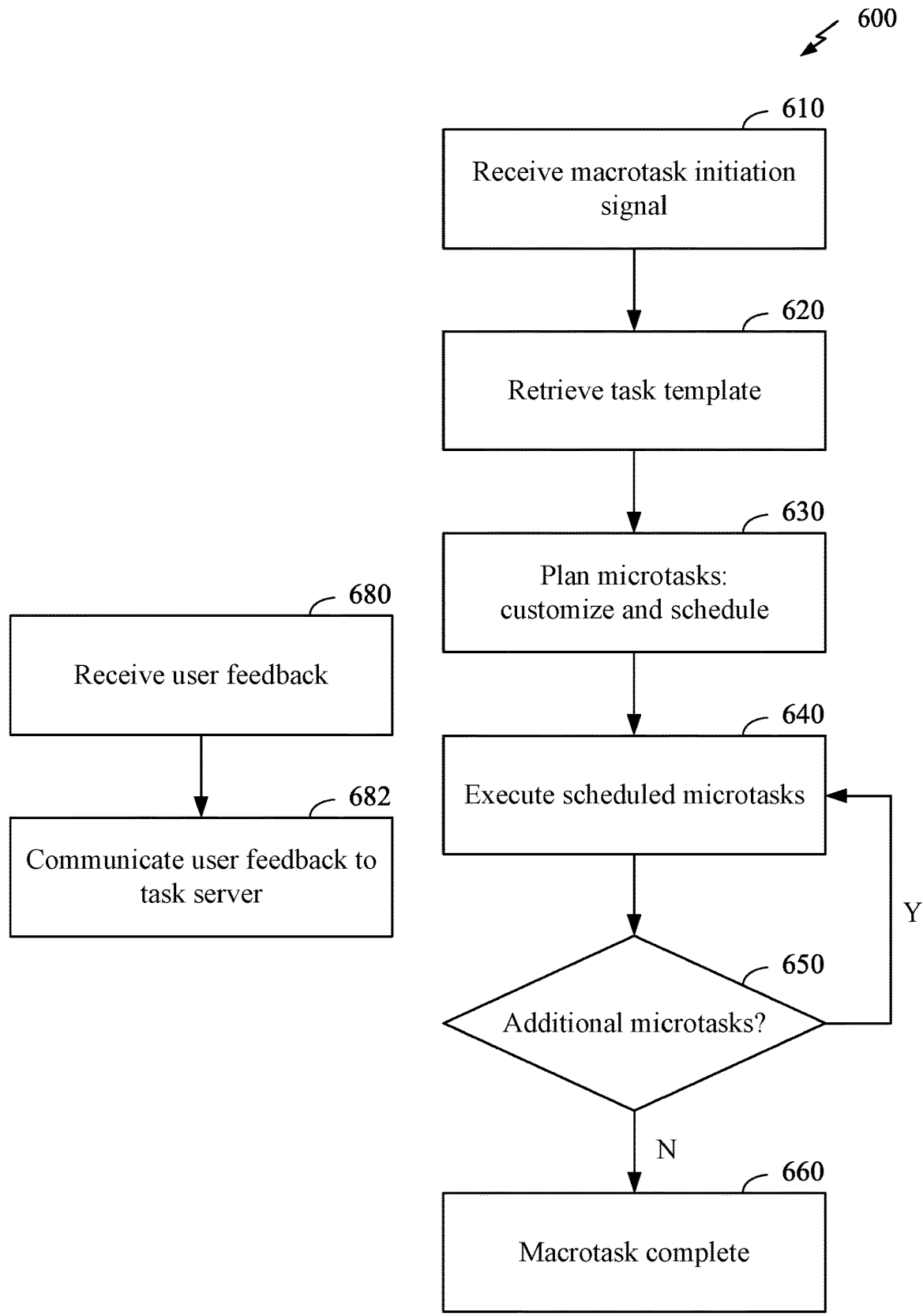
FIG. 6 illustrates an exemplary embodiment of a method performed by digital assistant device according to the present disclosure.

FIG. 6 illustrates an exemplary embodiment 600 of a method performed by digital assistant device 501 according to the present disclosure. Note FIG. 6 is shown for illustrative purposes only, and is not meant to limit the scope of the present disclosure to any particular method described.

In FIG. 6, at block 610, a signal to initiate a macrotask is received. In an exemplary embodiment, the initiation signal may include reception of a user macrotask query from any input modality recognized by device 501, e.g., a segment of speech, touchscreen or keyboard input, etc. For example, a segment of speech corresponding to user statement 112 in FIG. 2 may be processed by HW I/O block 522 and input recognition block 526 of FIG. 5 to generate the macrotask initiation signal. In alternative exemplary embodiments, an initiation signal may be automatically generated by device 501, e.g., according to a periodic schedule (e.g., annually or quarterly scheduled events), or in response to other event-based triggers such as news events, pre-scheduled events, etc. In an exemplary embodiment, the intent of the user statement behind the signal may be analyzed, and a macrotask repository is searched for a matching intent as described hereinbelow.

At block 620, a task template is retrieved in response to the initiation signal. In an exemplary embodiment, information contained in the initiation signal may be used to query an online macrotask repository to determine the referenced macrotask. For example, statement 112 may be provided to online macrotask repository 552 in FIG. 5, which may cause one or more task templates corresponding to the trip planning macrotask to be retrieved.

At block 630, microtasks corresponding to the retrieved task template are planned. In particular, customization of the task template and/or microtasks may be performed according to user characteristics, or other information specific to device 501. In an exemplary embodiment, task customization block 538 may be called upon to customize the tasks prepared for execution by block 536 from the retrieved task template. An explicit example of task template customization is further described with reference to FIG. 10 hereinbelow.

Figure 8:
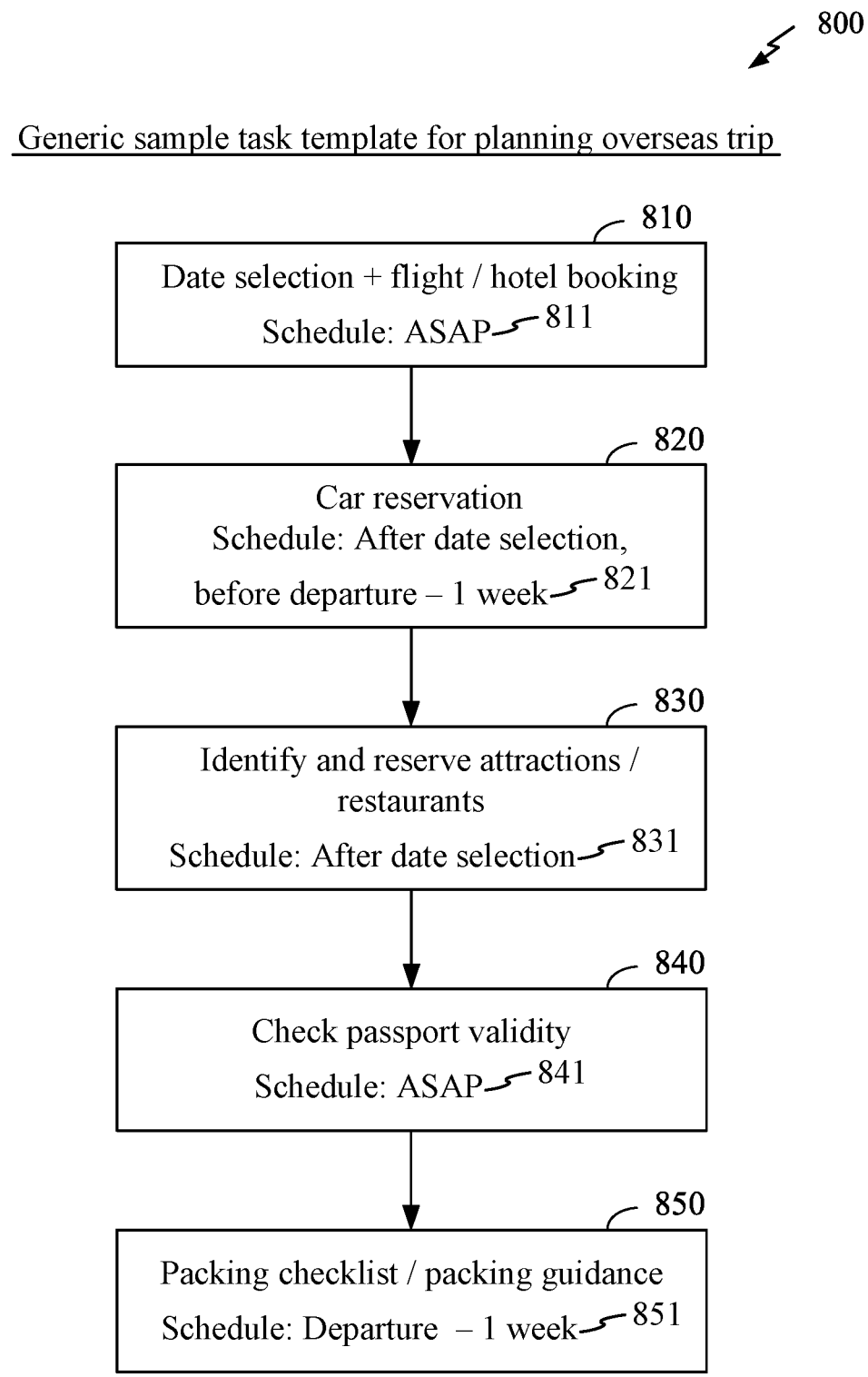
FIG. 8 illustrates an example of a hypothetical task template for the trip planning macrotask.

Further at block 630, microtask scheduling is performed. In an exemplary embodiment, and as illustrated in the example of FIG. 8, the task template may specify when to schedule each microtask for execution.

At block 640, scheduled microtasks are executed by device 501. In an exemplary embodiment, microtask execution may be performed by blocks 540 and 542 of module 530.

At block 650, it is checked whether additional microtasks are to be executed. If all microtasks in the task template have been executed, the macrotask is deemed complete at block 660. In an exemplary embodiment, device 501 is responsible for tracking the progress of the macrotask in this manner, and may alert and/or remind the user about the presence of incomplete tasks. In certain exemplary embodiments, a task template may specify a timeline against which progress of the macrotask may be measured. For example, some macrotasks may take a longer period of time to complete than others, and this information may also be specified in the task template.

At any point during processing of blocks 610-660, device 501 may receive user feedback regarding task performance, as indicated by blocks 680-690. For example, after microtasks are scheduled at block 630, a user may provide feedback that certain microtasks are being scheduled too early or too late, etc. Furthermore, after the macrotask is completed at block 660, a user may express an overall opinion of the task template, e.g., whether the macrotask was satisfactorily served by the chosen task template, or whether there needs to be improvement in the task template, etc. Upon receiving user feedback at block 680, module 530 may communicate the user feedback to task server 550, e.g., via block 544 to feedback processing block 556 of task server 550.

Figure 7:
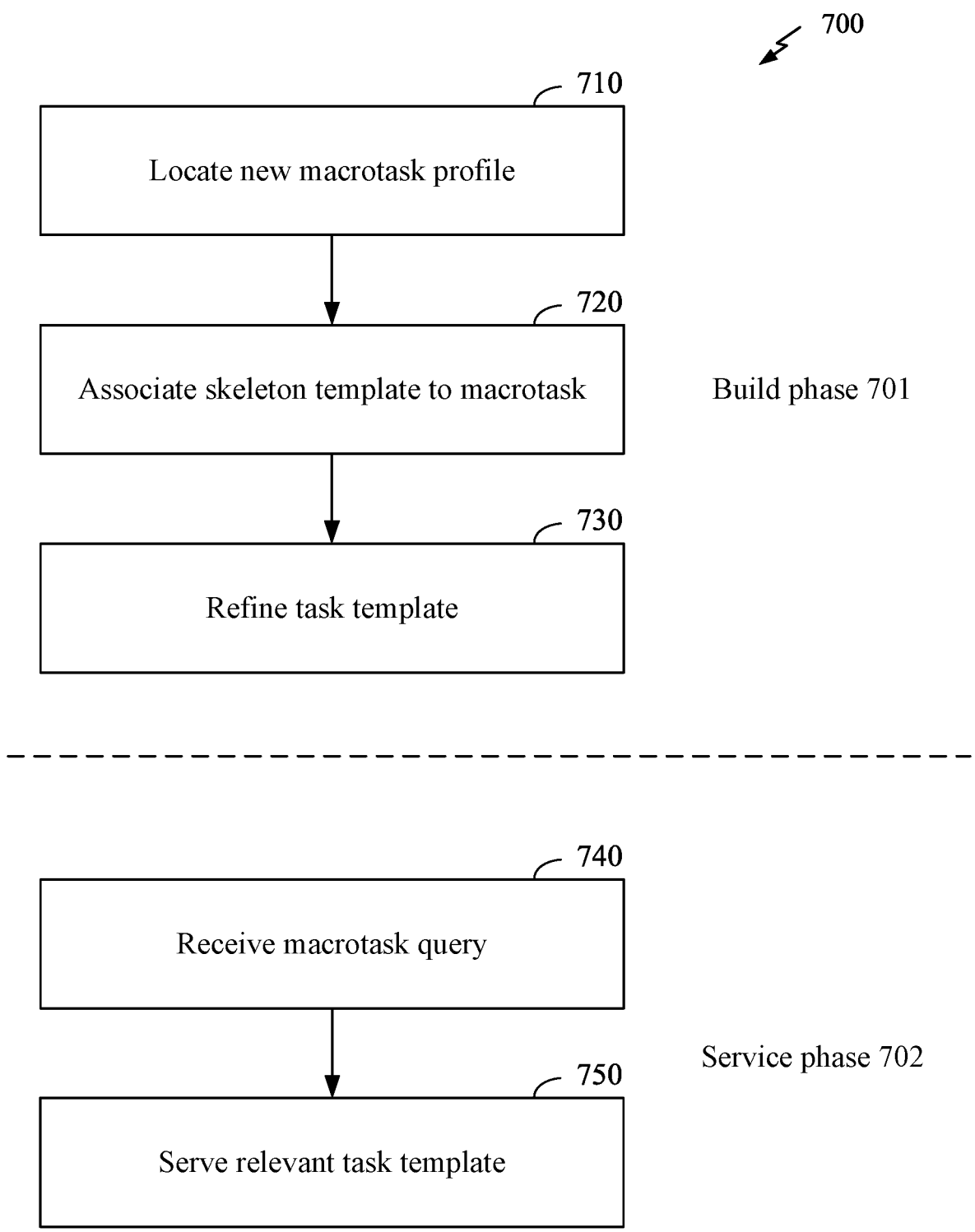
FIG. 7 illustrates an exemplary embodiment of a method performed by a task server according to the present disclosure.

FIG. 7 illustrates an exemplary embodiment of a method 700 performed by task server 550 according to the present disclosure. Note FIG. 7 is shown for illustrative purposes only, and is not meant to limit the scope of the present disclosure to any particular method described. Further note that phases 701, 702 need not be sequential, and may be executed in tandem in certain exemplary embodiments.

In FIG. 7, at build phase 701, the task server builds a macrotask repository. In particular, at block 710, a new macrotask profile is created, along with identifying information such as a macrotask header (e.g., a title of the macrotask) and brief description of the macrotask. The identifying information may aid in retrieving the macrotask from the macrotask repository, and in subsequently soliciting crowd-sourced input in defining the macrotask, etc. In an exemplary embodiment, the creation of new macrotasks may be suggested by human editors or by suggestions received through crowd-sourcing.

At blocks 720 and 730, a task template may be associated with the created macrotask profile. A task template may include a possible breakdown of a macrotask into a plurality of executable microtasks, as well as suggested timings for when to execute the microtasks. Illustrative examples of task templates are described hereinbelow, e.g., with reference to FIGS. 8 and 10. In an exemplary embodiment, any task template may be manually created and refined by a human editor and/or crowd-sourced.

At block 720, a skeleton template may be associated to a macrotask profile, e.g., by a human editor. For example, the skeleton template for the trip planning macrotask may include basic microtasks such as booking a flight and hotel, and checking for passport requirements and validity. Subsequently, at block 730, the skeleton template may be refined to generate a full task template, e.g., by human editor(s), and/or by soliciting further input from Internet users via crowd-sourcing. In an exemplary embodiment, user feedback regarding task templates may also be received by task server 550 at block 730. In particular, user feedback may also be applied to refine the task templates in the macrotask repository.

At service phase 702, macrotask queries are received and served. In particular, at block 740, task server 750 receives a macrotask query, e.g., originating from service requests generated by digital assistant devices at block 620 of method 600. At block 750, a task template relevant to the macrotask is served.

In an exemplary embodiment, a task server may match a macrotask query to relevant macrotask profiles using machine learning techniques, e.g., as may be applied by state-of-the-art search engine algorithms. For example, user statement 112 of "I'd like to go to France this summer" may constitute a macrotask query received by task server 750 at block 740. In response to this query, server 750 may use search algorithms to retrieve the relevant macrotask profile for trip planning, or to retrieve even more specific macrotask profiles such as "overseas trip planning" or "planning a trip to France from the US." It will be appreciated that relevance may be determined with reference to, e.g., the macrotask header, description, associated microtasks, etc.

FIG. 8 illustrates an example 800 of a hypothetical task template for an overseas trip planning macrotask. Note FIG. 8 is shown for illustrative purposes only, and is not meant to limit the scope of the present disclosure to any particular types of macrotasks or task profiles.

In FIG. 8, microtask 810 includes date selection and flight/hotel booking. Schedule 811 indicates that microtask 810 may be executed as soon as possible after initiation of the macrotask. FIG. 9 hereinbelow illustrates an exemplary embodiment of technical steps that may be performed to execute microtask 810 by device 501.

At microtask 820, car reservation is performed. Schedule 821 indicates that microtask 821 may be executed after date selection at block 810, and up to 1 week before the scheduled departure.

At microtask 830, attractions and restaurants at the destination may be identified and reserved. Schedule 831 indicates that microtask 830 may be executed after date selection is performed, e.g., at block 810.

At microtask 840, passport validity is checked for the destination country. Schedule 841 indicates that microtask 840 may be executed as soon as possible, e.g., after date selection.

At microtask 850, a packing checklist is assembled, and packing guidance based on the checklist is offered to the user. Schedule 851 indicates that microtask 850 may be performed one week prior to departure.

Figure 9A:
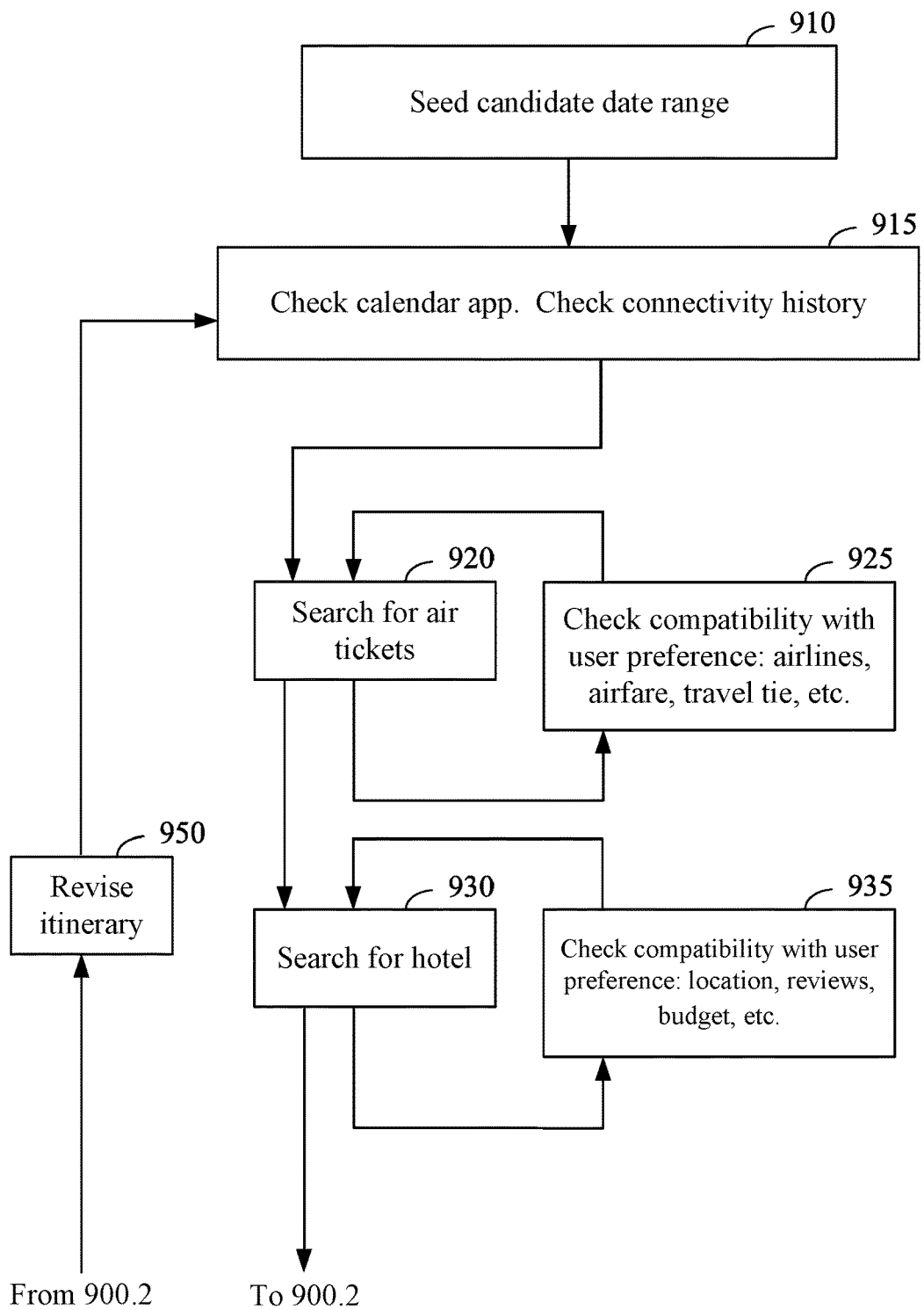
FIGS. 9A and 9B illustrate an exemplary specification of a sample microtask in terms of digital operations executable by a digital assistant device.
Figure 9B:
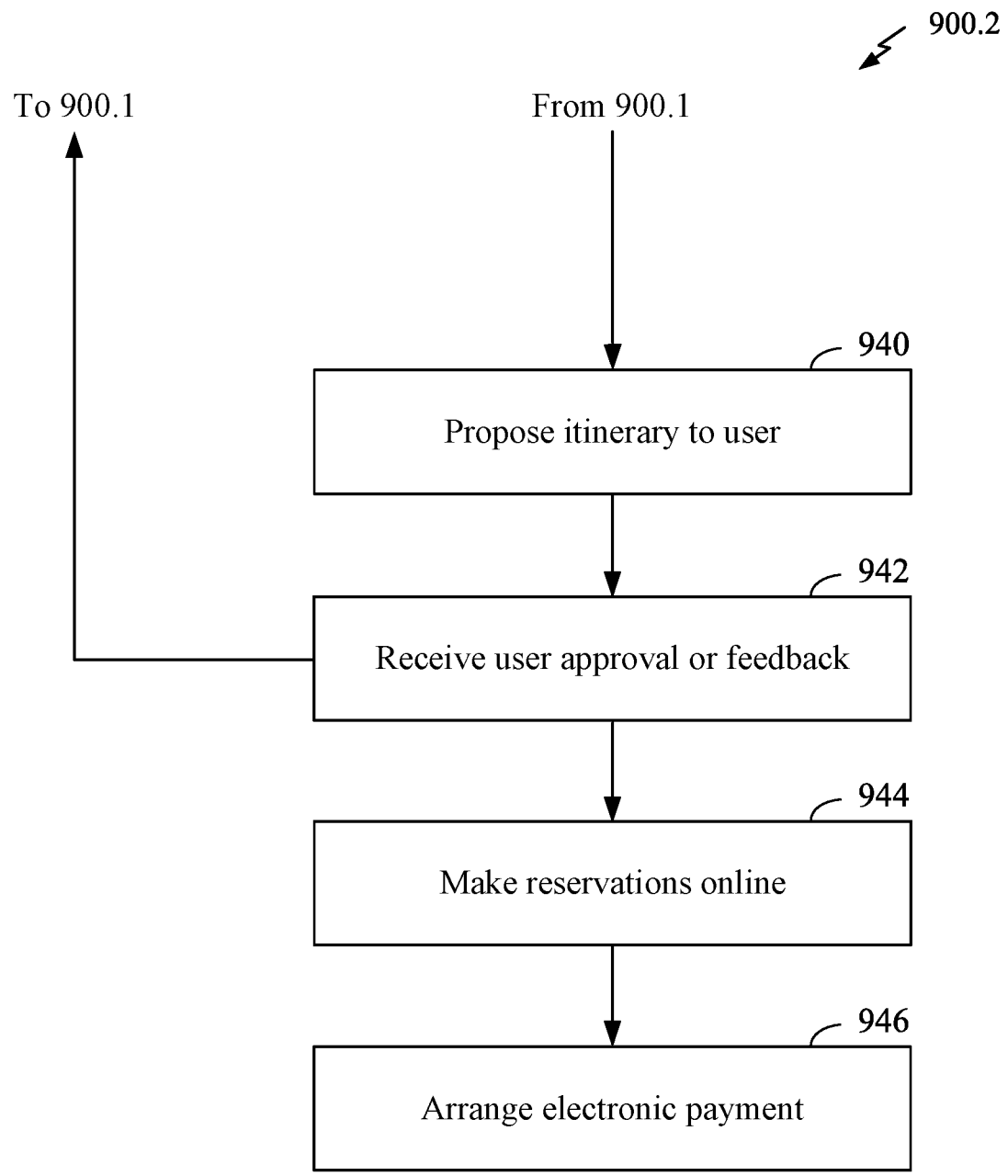

FIGS. 9A and 9B illustrate an exemplary specification 900 of a sample microtask in terms of digital operations executable by a digital assistant device. Note FIGS. 9A, 9B are shown for illustrative purposes only, and is not meant to limit the scope of the present disclosure to any particular implementation of microtasks by a digital assistant device. The illustrative microtask shown in FIGS. 9A, 9B corresponds to microtask 810 of example 800, wherein date selection and flight/hotel booking is performed. It will be appreciated that the digital operations indicated in FIGS. 9A, 9B are not specified in any actual "machine" or predefined software programming language. However, one of ordinary skill in the art may readily derive the corresponding software code for the specified operations in view of the description in FIGS. 9A, 9B.

At block 910, a candidate date range is "seeded" or initially selected for the trip. In an exemplary embodiment, a task template retrieved for the trip planning macrotask may generally specify, e.g., a default two-week duration for an overseas trip to France, while the user specification of a trip during the summer may set the initial date range to be in June. The seeded date range may subsequently be refined using additional operations as described hereinbelow.

For example, at block 915, module 530 may check the seeded date range with the user's schedule as stored and configured by a calendar application of device 501, e.g., calendar/appointment organizer 505 in FIG. 5. In particular, the user of device 501 may use the calendar application 505 on device 501 to keep track of dates and appointments. In this manner, by accessing data made available to the calendar application, macrotask module 530 may at block 915 select only candidate date ranges that do not overlap with the user's pre-existing appointments or commitments.

Further at block 915, the candidate date range may also be checked against knowledge of the user's schedule as derived from, e.g., machine-based analysis of the user's communication records or connectivity history on device 501. For example, users' emails, instant messages, or social media postings may be analyzed by a machine learning module (not shown in FIG. 5) and made available to device 501, which may then infer whether the user is available or unavailable during particular periods of time. It will be appreciated that search inference may be performed using, e.g., machine learning techniques configured to derive meaning from a specified corpus of messages or text, etc.

In an exemplary embodiment, the candidate date range may be further refined based on the results of online search for air tickets. For example, at block 920, module 530 may be configured to submit a candidate date range to an online travel reservation service to retrieve possible air travel itineraries. The identities of the travel reservation services may be specified in the task template, or they may be chosen by module 530 from a pre-configured set, etc. Data submitted to the travel reservation service may include, e.g., origin/destination information, as well as user preferences (if any) for airfare class, airline, frequent flyer membership, etc., e.g., at block 925.

In an exemplary embodiment, the candidate date range may be further refined based on the results of online search for lodging. For example, at block 930, module 530 may be configured to submit a candidate date range to an online travel reservation service to retrieve possible lodging options, e.g., hotels, at the destination during the candidate dates specified. Data submitted may include, e.g., user preferences (if any) for type of lodgings, cost, location, etc., e.g., at block 935.

In an exemplary embodiment, based on refinement of candidate date ranges and retrieval of airfare and lodging candidates at blocks 910-930, at block 940, the proposed trip itinerary may be presented to the user via the user interface. The user may accept the proposed itinerary at block 942, or else request module 530 to revise the itinerary in some manner at block 950. For example, the user may request an earlier or later set of dates, make modifications to the hotel budget and/or airplane travel time, etc. Responsive to user input, blocks 915-935 may be reiterated to revise the itinerary.

Once the user accepts the proposed itinerary at block 942, module 530 may proceed to make the selected reservations at block 944. At block 946, electronic payment for the reservations may be arranged. In an exemplary embodiment, module 530 may have access to electronic payment data for the user, e.g., as stored by digital assistant device 501. Module 530 may communicate with the travel reservation services to reserve the selected services for the user by submitting electronic payment online.

Figure 10:
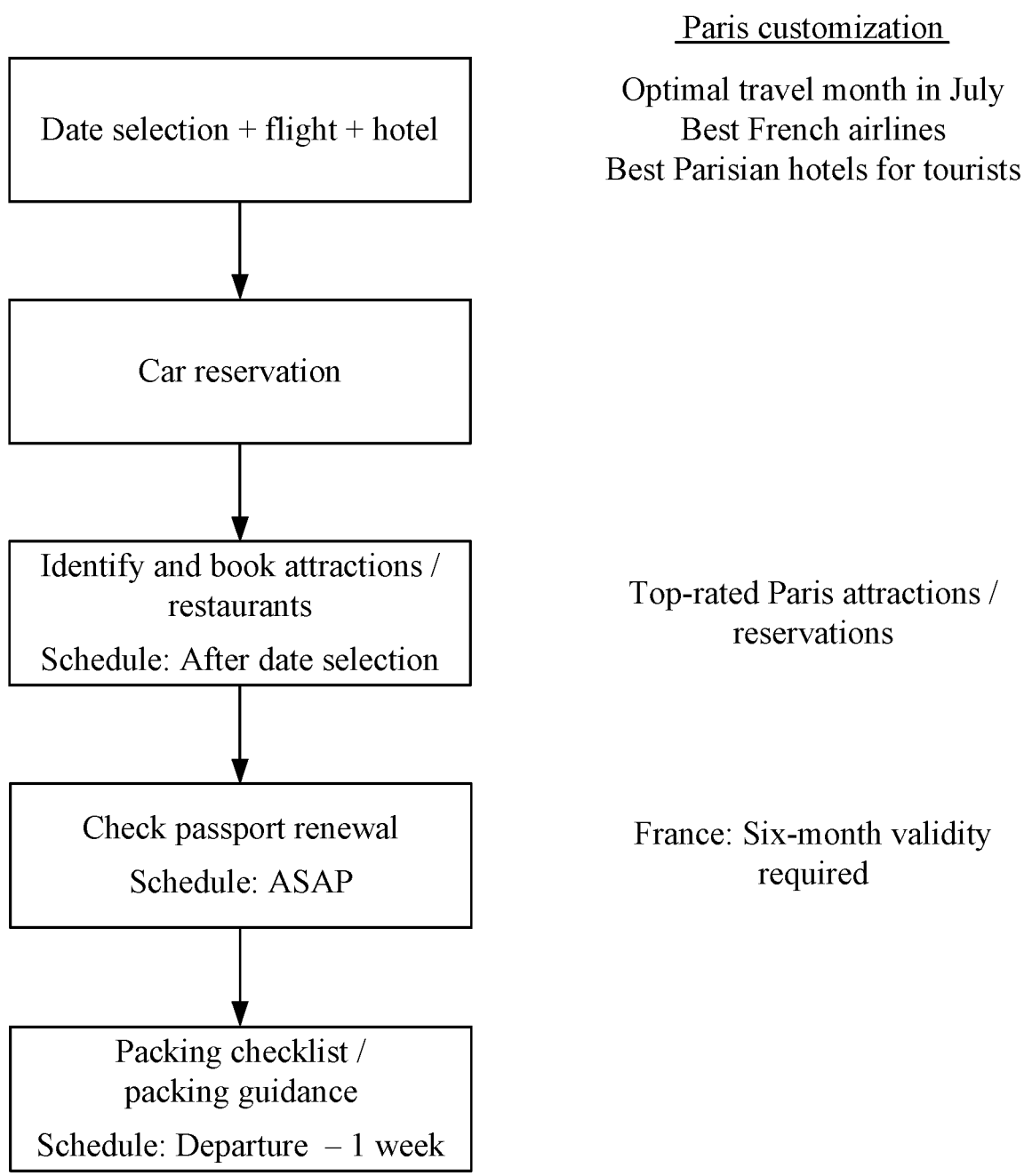
FIG. 10 illustrates an exemplary embodiment of a customized task template, e.g., corresponding to a version of the trip planning task template that is especially customized for a particular destination.

FIG. 10 illustrates an exemplary embodiment of a customized task template 1000, e.g., corresponding to a version of the trip planning task template that is especially customized for a trip to Paris. As shown in FIG. 10, specific customizations to the generic task template 800 of FIG. 8 may be incorporated in task template 800, e.g., based on specifically optimal times for travel to Paris, airlines and/or hotels especially catering to tourists, etc. As described hereinabove with reference to blocks 720, 730 in FIG. 7, the crowd-sourcing of task template design and/or refinement to a potentially large number of Internet users allows each macrotask to incorporate a large number of possible implementations and variations, as is appropriate to suitably capture the complexity and richness of individual microtasks.

While certain exemplary embodiments have been described herein with reference to a trip planning macrotask, it will be understood that techniques of the present disclosure are not limited to any particular types of macrotasks that can be processed. Note besides trip planning, other examples of macrotasks include, e.g., moving in to a new apartment, buying a house or car, writing a research paper, etc.

Figure 11:
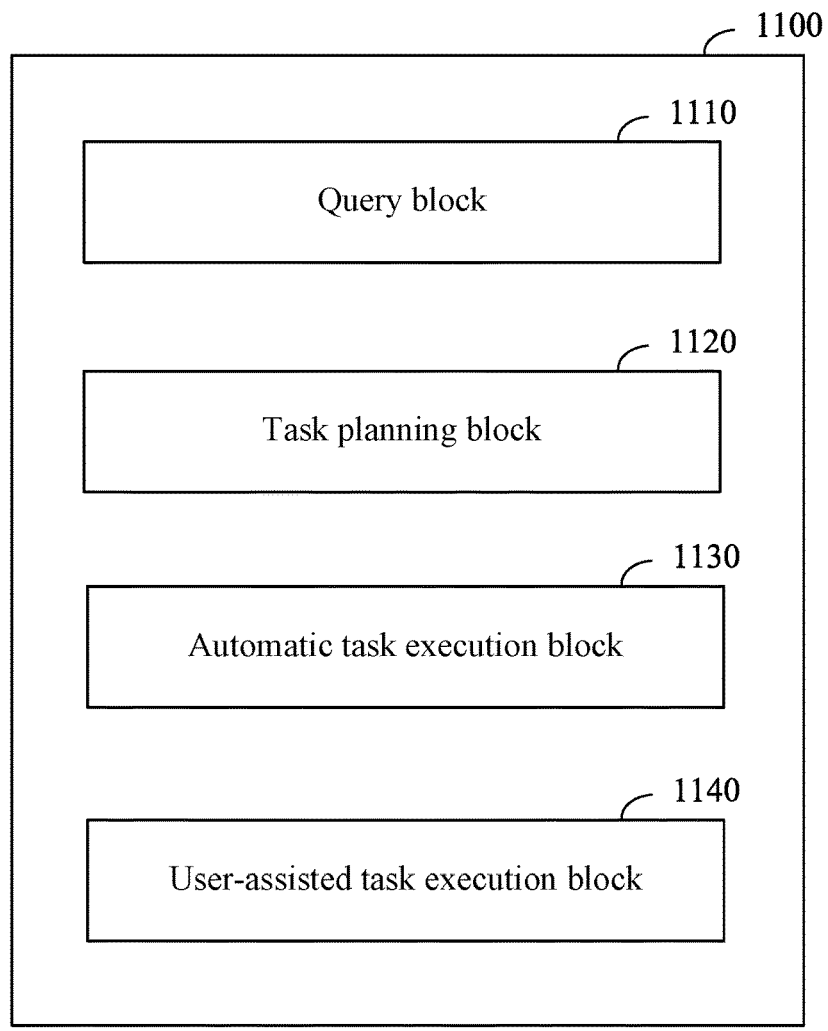
FIG. 11 illustrates an exemplary embodiment of an apparatus according to the present disclosure.

FIG. 11 illustrates an exemplary embodiment of an apparatus 1100 according to the present disclosure. Note FIG. 11 is shown for illustrative purposes only, and is not meant to limit the scope of the present disclosure.

In FIG. 11, apparatus 1100 includes a query block 1110 configured to query a macrotask repository in response to receiving a macrotask initiation signal from a user. A task planning block 1120 is configured to receive from the macrotask repository a task template comprising a plurality of microtasks, and to schedule the plurality of microtasks for execution. In an exemplary embodiment, the plurality of microtasks comprises at least one automatically executable microtask and at least one user-assisted microtask. An automatic task execution block 1130 is configured to execute the scheduled at least one automatically executable microtask. A user-assisted task execution block 1140 is configured to execute the scheduled at least one user-assisted microtask after receiving further user input.

Figure 12:
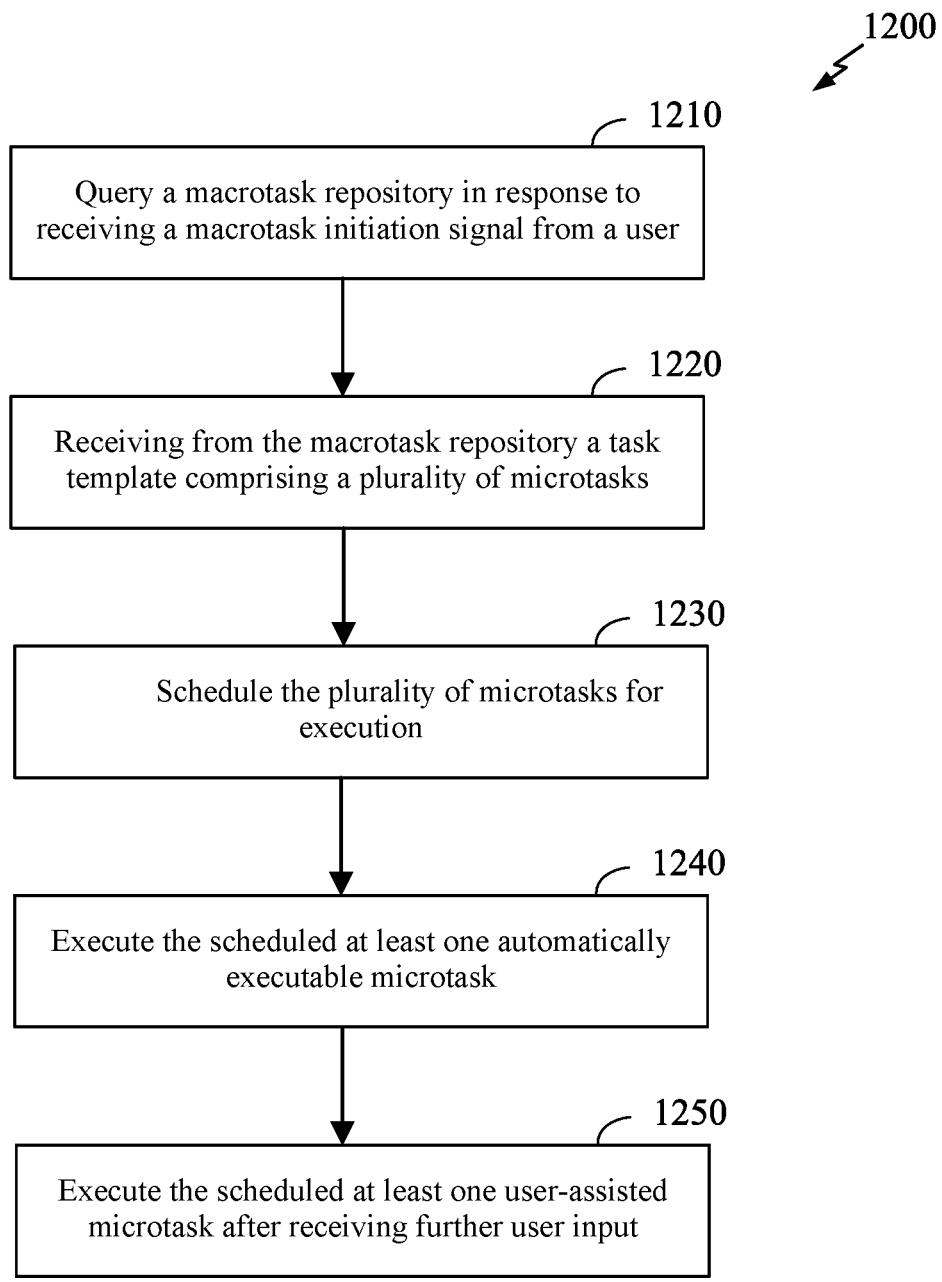
FIG. 12 illustrates an exemplary embodiment of a method according to the present disclosure.

FIG. 12 illustrates an exemplary embodiment of a method 1200 according to the present disclosure. Note FIG. 12 is shown for illustrative purposes only, and is not meant to limit the scope of the present disclosure.

In FIG. 12, at block 1210, a macrotask repository is queried in response to receiving a macrotask initiation signal from a user. At block 1220, a task template comprising a plurality of microtasks is received from the macrotask repository. At block 1230, the plurality of microtasks is scheduled for execution. In an exemplary embodiment, the plurality of microtasks comprises at least one automatically executable microtask and at least one user-assisted microtask. At block 1240, the scheduled at least one automatically executable microtask is executed. At block 1250, the scheduled at least one user-assisted microtask is executed after receiving further user input.

Figure 13:
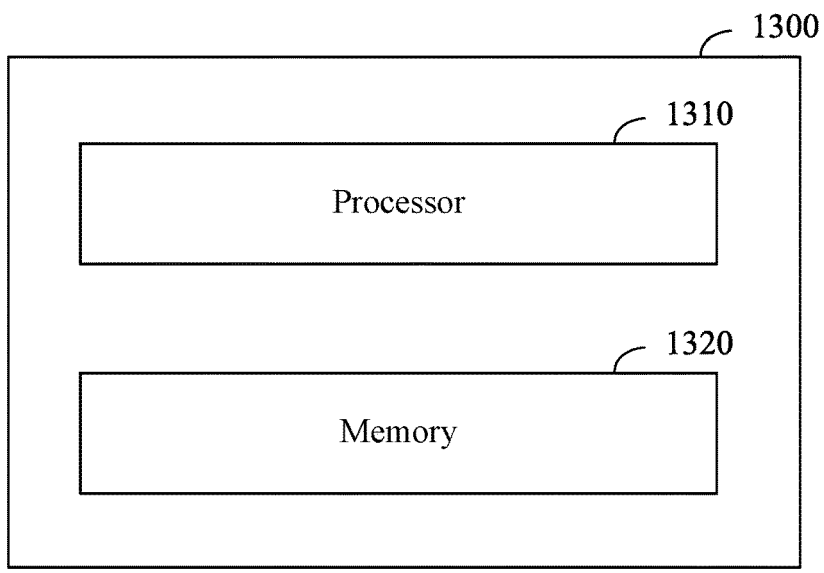
FIG. 13 illustrates an exemplary embodiment of a computing device according to the present disclosure.

FIG. 13 illustrates an exemplary embodiment of a computing device 1300 according to the present disclosure. Note FIG. 13 is shown for illustrative purposes only, and is not meant to limit the scope of the present disclosure.

In FIG. 13, a computing device 1300 includes a processor 1310 and a memory 1320 holding instructions executable by the processor to: query a macrotask repository in response to receiving a macrotask initiation signal from a user; receive from the macrotask repository a task template comprising a plurality of microtasks; schedule the plurality of microtasks for execution, the plurality of microtasks comprising at least one automatically executable microtask and at least one user-assisted microtask; execute the scheduled at least one automatically executable microtask; and execute the scheduled at least one user-assisted microtask after receiving further user input.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A digital assistant device comprising:
a query block that queries a macrotask repository on a remote server in response to receiving a signal from a user to initiate a macrotask which the digital assistant device is not configured to perform at a current time the signal is received;
a task planning block that performs operations of:
receive from the macrotask repository on the remote server a task template corresponding to the macrotask, the task template comprising a breakdown of the macrotask into a plurality of microtasks that are executable for performing the macrotask on the digital assistant device, and that include at least one automatically executable microtask and associated scheduling information for executing each of the plurality of microtasks, wherein the scheduling information indicates timing for executing the at least one automatically executable microtask on the digital assistant device based on completion of another microtask, and
schedule the plurality of microtasks for execution on the digital assistant device in accordance with the scheduling information of the task template;
a task customization block that automatically performs operations of:
access user profile information associated with the user, and
customize the at least one automatically executable microtask based on the user profile information;
an automatic task execution block that automatically executes the scheduled at least one automatically executable microtask based on completion of said another microtask; and
a display that presents at least some of the plurality of microtasks upon execution to the user.

2. The digital assistant device of claim 1, further comprising:
a hardware input/output block for interacting with the user;
an output generation block for generating an output signal for the hardware input/output block, the output signal comprising a speech waveform; and
an input recognition block for generating a recognized signal from an input signal received from the hardware input/output block, the recognized signal comprising text corresponding to a received speech waveform; wherein the signal to initiate the macrotask comprises a macrotask identifier present in the recognized signal.

3. The digital assistant device of claim 1, further comprising at least one of a web browsing application, a calendar application, and a communications connectivity application.

4. The digital assistant device of claim 1, the at least one automatically executable microtask comprising a digital operation of generating a reminder at a scheduled time.

5. The digital assistant device of claim 1, the plurality of microtasks comprise at least one user-assisted microtask comprising requiring user input for execution.

6. The digital assistant device of claim 5, the at least one user-assisted microtask further comprising at least one of:
a digital operation of submitting an online reservation request for a candidate date range to an online reservation service;
a digital operation of arranging for payment to the online reservation service.

7. The digital assistant device of claim 6, the digital operation of submitting the online reservation request for the candidate date range comprising:
- a digital operation of checking a calendar application executed by the digital assistant device to ensure the candidate date range does not overlap with a scheduled event on the calendar application;
- a digital operation of searching for travel accommodations for the candidate date range; and
- a digital operation of modifying the candidate date range based on results of the digital operation of searching for travel accommodations.

8. The digital assistant device of claim 1, the plurality of microtasks comprising at least one customizable microtask executable in a first manner responsive to a conditional qualifier having a first value, the at least one customizable microtask executable in a second manner responsive to the conditional qualifier having a second value.

9. The digital assistant device of claim 8, the conditional qualifier corresponding to a user preference, the at least one customizable microtask comprising a digital operation of submitting an online reservation request to an online reservation service.

10. The digital assistant device of claim 1, wherein the scheduling information includes suggested timing for completing at least one of the plurality of microtasks, the suggested timing being modifiable by the user.

11. The digital assistant device of claim 1, the macrotask repository comprising at least one task template configured by a plurality of crowd-source participants on the Internet.

12. The digital assistant device of claim 1, further comprising a task feedback generation block that performs operations of:
- receive user feedback regarding the macrotask; and
- transmit the user feedback to an online task server to update the macrotask repository in response to the user feedback.

13. A computing device including a processor and a memory holding instructions executable by the processor to:
- query a macrotask repository on a remote server in response to receiving a signal to initiate a macrotask from a user on the computing device which the computing device is not configured to perform at a current time the signal is received;
- receive from the macrotask repository on the remote server a task template corresponding to the macrotask, the task template comprising a breakdown of the macrotask into a plurality of microtasks that are executable for performing the macrotask by the computing device, and that include at least one automatically executable microtask and associated scheduling information for executing each of the plurality of microtasks, wherein the scheduling information indicates timing for executing the at least one automatically executable microtask by the computing device based on completion of another microtask;
- schedule the plurality of microtasks for execution by the computing device in accordance with the scheduling information of the task template;
- access user information associated with the user;
- automatically customize the scheduled at least one automatically executable microtask based on the user information;
- automatically execute the scheduled at least one automatically executable microtask; and
- present on a display a notification to the user that at least some of the plurality of microtasks are executed.

14. The computing device of claim 13, the memory further holding instructions executable by the processor to:
- interact with the user through a hardware input/output block;
- generate an output signal for the hardware input/output block, the output signal comprising a speech waveform; and
- generate a recognized signal from an input signal received from the hardware input/output block, the recognized signal comprising text corresponding to a received speech waveform; wherein the signal to initiate the macrotask comprises a macrotask identifier present in the recognized signal.

15. A method of performing a macrotask on a computing device, comprising:
- querying a macrotask repository on a remote server in response to receiving a signal from a user to initiate the macrotask which the computing device is not configured to perform at a current time the signal is received;
- receiving from the macrotask repository on the remote server a task template corresponding to the macrotask, the task template comprising a breakdown of the macrotask into a plurality of microtasks that are executable for performing the macrotask on the computing device, and that include at least one automatically executable microtask and associated scheduling information for executing each of the plurality of microtasks, wherein the scheduling information indicates timing for executing the at least one automatically executable microtask on the computing device based on completion of another microtask;
- scheduling the plurality of microtasks for execution on the computing device in accordance with the scheduling information of the task template;
- accessing user profile information associated with the user;
- customizing the at least one automatically executable microtask based on the user profile information;
- automatically executing the scheduled at least one automatically executable microtask based on completion of said another microtask; and
- presenting at least some of the plurality of microtasks upon execution to the user.

16. The method of claim 15, the at least one automatically executable microtask comprising a digital operation of generating a reminder at a scheduled time.

17. The method of claim 15, the plurality of microtasks comprise at least one user-assisted microtask comprising requiring user input for execution.

18. The method of claim 17, the at least one user-assisted microtask further comprising at least one of:
- a digital operation of submitting an online reservation request for a candidate date range to an online reservation service;
- a digital operation of arranging for payment to the online reservation service.

19. The method of claim 18, the digital operation of submitting the online reservation request for the candidate date range comprising:
- a digital operation of checking a calendar application executed by the computing device to ensure the candidate date range does not overlap with a scheduled event on the calendar application;
- a digital operation of searching for travel accommodations for the candidate date range; and a digital operation of modifying the candidate date range based on results of the digital operation of searching for travel accommodations.

20. The method of claim 15, the plurality of microtasks comprising at least one customizable microtask executable in a first manner responsive to a conditional qualifier having a first value, the at least one customizable microtask executable in a second manner responsive to the conditional qualifier having a second value.

\* \* \* \* \*